H. P. WELLMAN.
REPORTING AND BILLING DEVICE.
APPLICATION FILED MAR. 11, 1908.

1,151,075.

Patented Aug. 24, 1915.
6 SHEETS—SHEET 1.

Fig. 1.

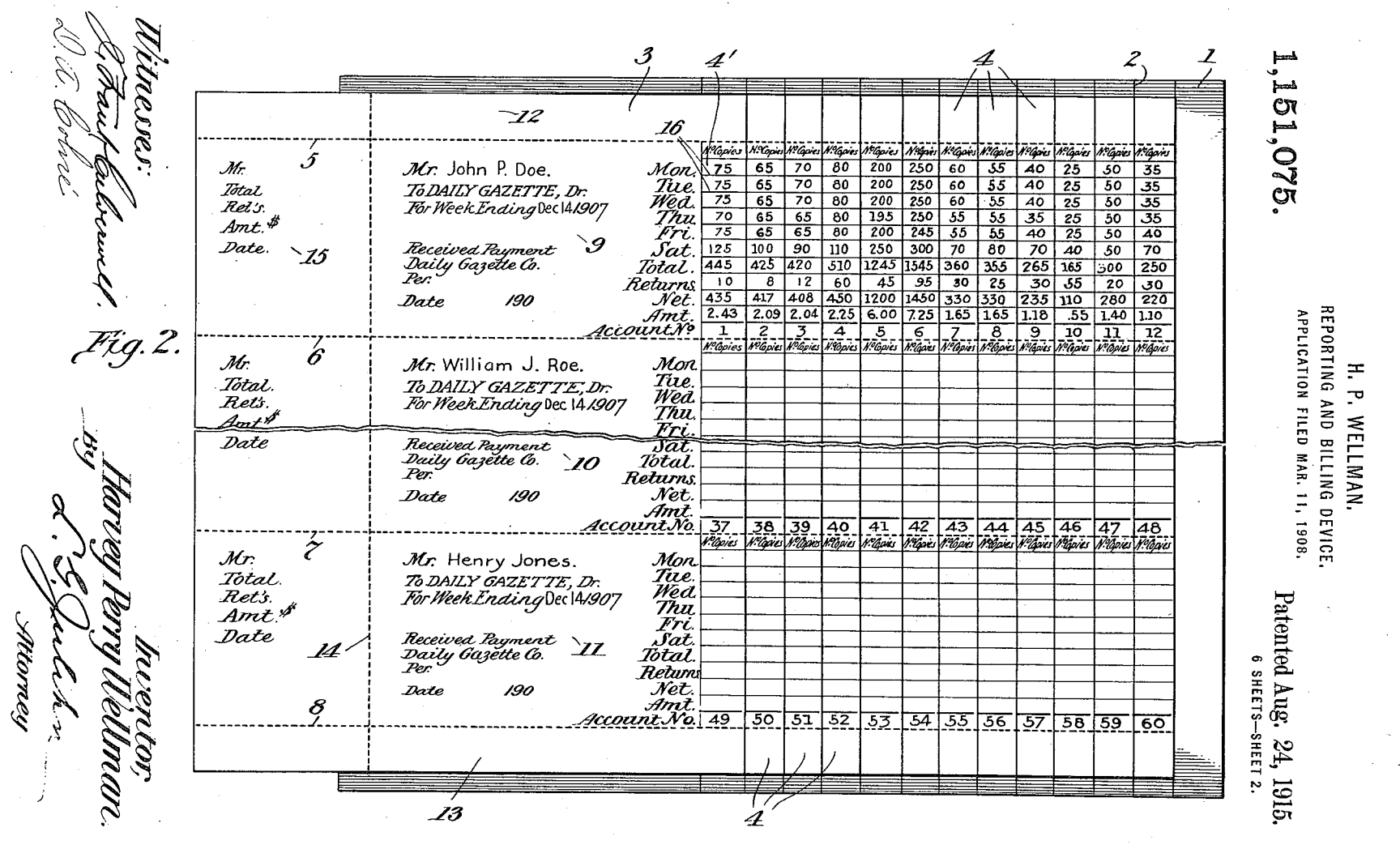

H. P. WELLMAN.
REPORTING AND BILLING DEVICE.
APPLICATION FILED MAR. 11, 1908.

1,151,075.

Patented Aug. 24, 1915.
6 SHEETS—SHEET 2.

Fig. 2.

Witnesses:

Inventor,
Harvey Perry Wellman.
By L. G. Julihn
Attorney

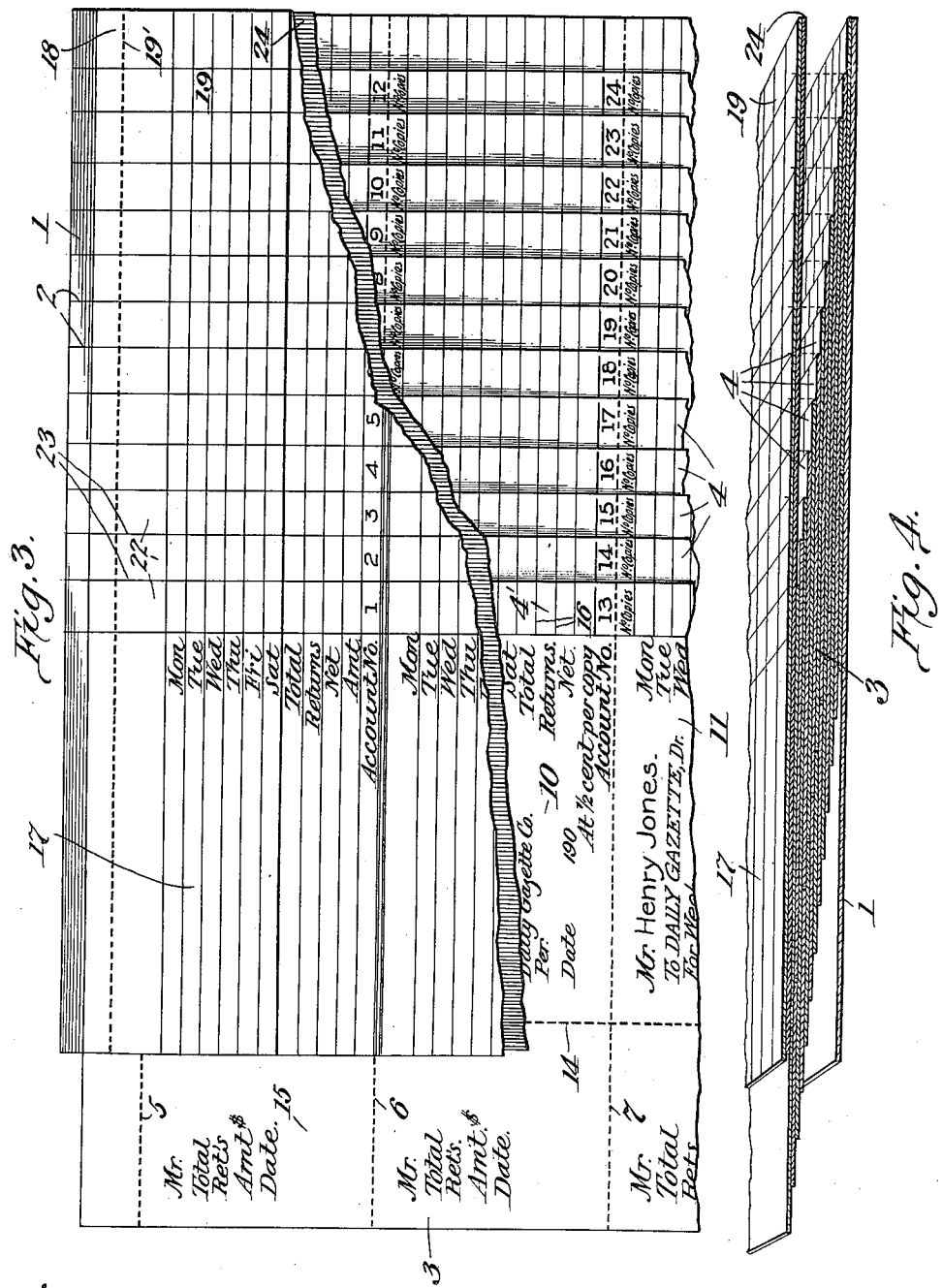

H. P. WELLMAN.
REPORTING AND BILLING DEVICE.
APPLICATION FILED MAR. 11, 1908.

1,151,075.

Patented Aug. 24, 1915.
6 SHEETS—SHEET 4.

Fig. 5.

Inventor,
Harvey Perry Wellman.

Fig. 6.

H. P. WELLMAN.
REPORTING AND BILLING DEVICE.
APPLICATION FILED MAR. 11, 1908.

1,151,075.

Patented Aug. 24, 1915.
6 SHEETS—SHEET 6.

Witnesses:

Inventor,
Harvey Perry Wellman.
By
Attorney.

UNITED STATES PATENT OFFICE.

HARVEY P. WELLMAN, OF ALBANY, NEW YORK, ASSIGNOR TO ELLIOTT-FISHER COMPANY, OF NEW YORK, N. Y., A CORPORATION OF DELAWARE.

REPORTING AND BILLING DEVICE.

1,151,075.      Specification of Letters Patent.    Patented Aug. 24, 1915.

Application filed March 11, 1908. Serial No. 420,523.

*To all whom it may concern:*

Be it known that I, HARVEY P. WELLMAN, a citizen of the United States, residing at Albany, in the county of Albany and State of New York, have invented certain new and useful Improvements in Reporting and Billing Devices, of which the following is a specification.

My present invention relates to means facilitating the preparation of a report of a volume of business and the simultaneous preparation of bills or statements of the individual accounts included in the report. To the accomplishment of this object, the illustrated embodiments of the invention comprehend a novel arrangement of a report sheet and a series of billing sheets, the report sheet being subdivided into a compact arrangement of account columns and the billing sheets being disposed in overlapping relation with the margins thereof exposed below and in registration with the account columns on the report sheet, in order that the data entered in the individual account columns on the report sheet may be simultaneously transferred to the statement sheets. This novel arrangement of the several sheets facilitates the handling of a large number of individual statements and renders the operation of billing a mere incident to the preparation of the report.

Considered in more specific aspects, the invention includes various other details of construction and arrangement hereinafter fully described, illustrated in the accompanying drawings and defined in the appended claims.

Figure 6:
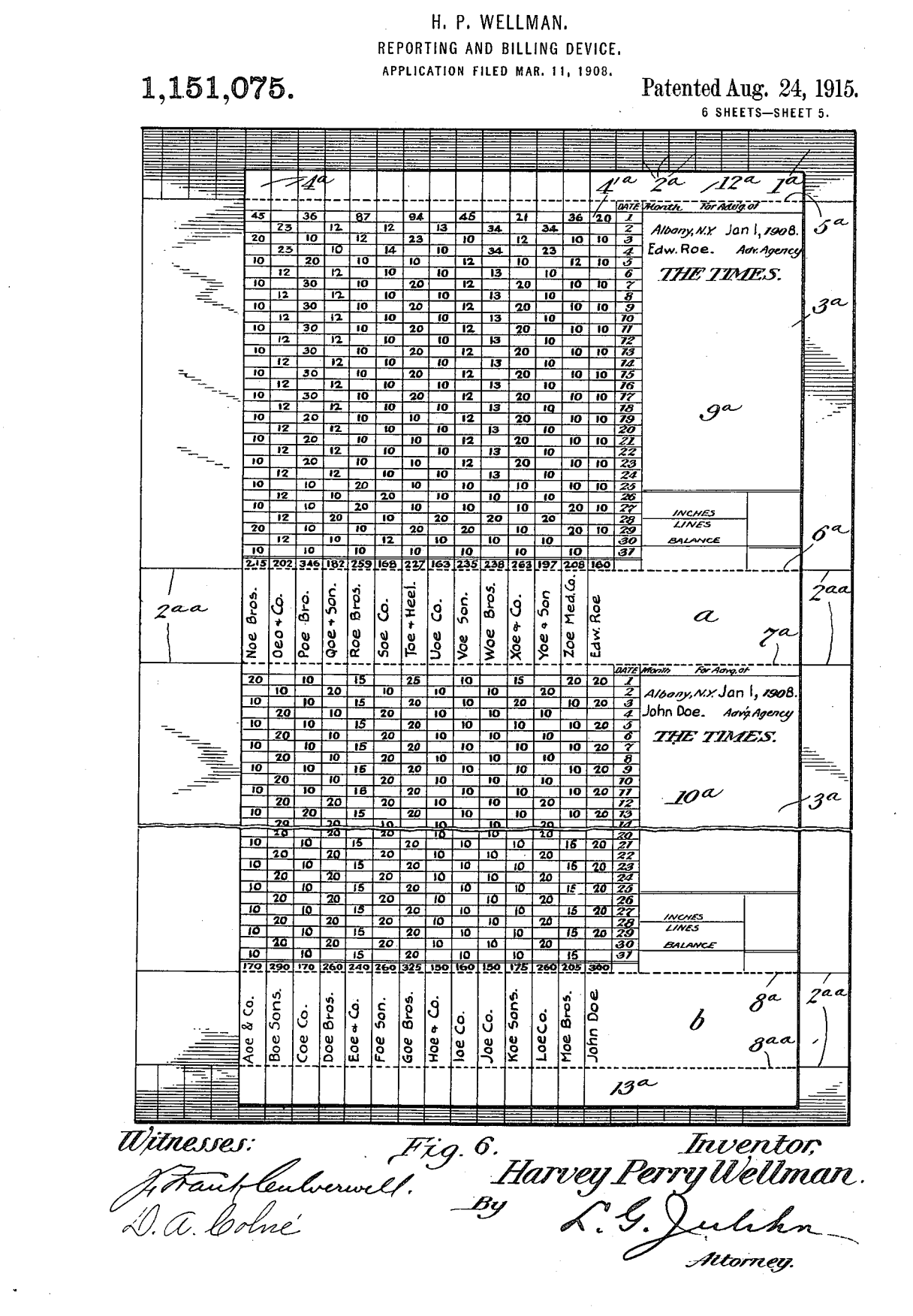
Figure 7:
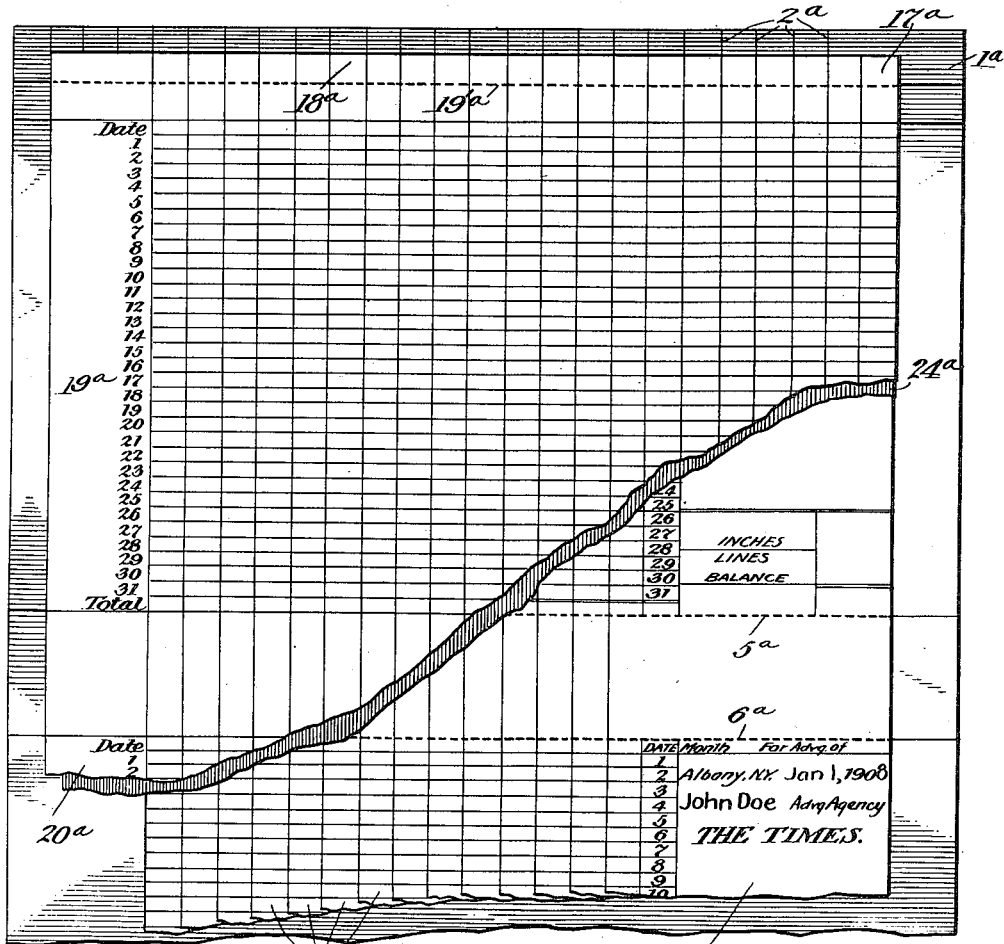
Figure 8:
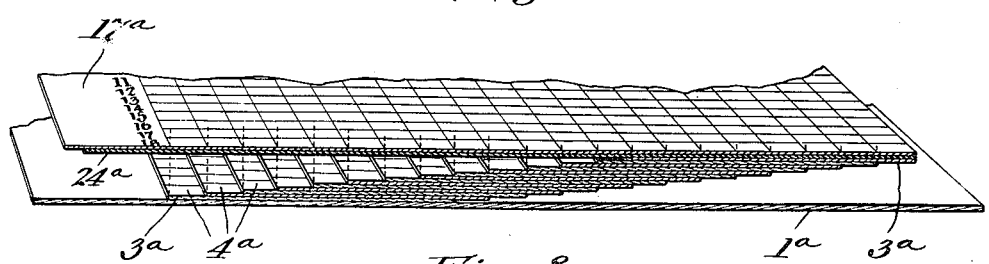

In said drawings, Figure 1 is a plan view of the device with a section thereof removed and showing more particularly the arrangement of the report sheet and the manner in which it is attached to the base or platen in accurate registration. Fig. 2 is a similar view with the report sheet removed, the account data on the uppermost series of statement blanks having been filled in. Fig. 3 is still another plan view with parts broken away to more clearly show the relative arrangement of the base or platen, the statement sheets, the transfer web, and the report sheet. Fig. 4 is a sectional perspective view showing the relative arrangement of the parts with certain dimensions of the sheets exaggerated to facilitate the illustration. Fig. 5 is a view similar to Fig. 1, but showing a somewhat different arrangement of the data on the report sheet. Fig. 6 is a view similar to Fig. 2, but showing the arrangement of the statement blanks employed in connection with the report sheet shown in Fig. 5. Fig. 7 is a plan view with the parts broken away to illustrate the arrangement shown in Figs. 5 and 6, and Fig. 8 is an exaggerated sectional perspective view of the subject-matter of Fig. 7.

It may be stated by way of premise that while the system contemplated by my invention is susceptible of a wide range of usefulness, it has been devised with special reference to accounting and billing in connection with a single commodity, as for instance newspaper sales or advertising. It should be noted at the outset, however, that the invention is not limited to use in connection with a single commodity, since it will be readily understood that the subdivisions of the individual accounts which, in the two illustrated forms of the invention are appropriated to periods of time, may, if desired, be appropriated to different products.

Referring first to Figs. 1 to 4 of the drawings, wherein I have shown my invention utilized for the reporting and billing of newspaper sales, 1 indicates a flat base or platen which may either be the flat platen of a typewriter, or, as here shown, a separate sheet of cardboard, metal, or other suitable material adapted to form a backing for the superposed sheets, whether the data is to be imprinted upon the latter by a typewriter, a stylus, or any other known mode of entry.

The platen 1 is provided along its upper and lower margins with suitable guide lines 2 printed thereon or indented therein and designed to facilitate proper registration of the reporting and billing sheets. Imposed upon the platen 1 are a series of billing sheets 3 overlapping one another, but each having its edge in registration with the guide line 2 in advance of the line registering with the superposed sheet. This arrangement of the billing sheets causes a marginal space or portion 4 of each sheet to be presented beyond the edge of the adjacent overlapping sheet, so that while the uppermost sheet will be the only one fully exposed, each of the subjacent sheets will have an exposed margin to which data may be transferred from an overlying report sheet, as will be more fully described.

Each of the billing sheets 3 is preferably subdivided by parallel weakening lines 5, 6, 7 and 8, into a plurality of statement blanks 9, 10 and 11, and two marginal attaching strips 12 and 13. It will of course be understood that the number of statement blanks in each statement sheet is a matter of choice, but the handling of a large number of blanks is materially facilitated by arranging them in sheets, as shown. The attaching strips 12 are designed to be pasted or otherwise secured to the base 1 for the purpose of retaining the blanks in proper position during the entry of the data, but other means for retaining the sheets 3 in place may be substituted for that shown. Each statement sheet is further subdivided by a weakening line 14 extending transverse to the lines 5, 6, etc., at a suitable distance from the left hand edge of the sheet to form a detachable or separable stub 15 at the left hand end of each blank.

Referring now to one of the individual statement blanks, as for instance the blank 9, it will be noted that the marginal space 4' thereof is appropriately designated by the numeral 1, which, taken in connection with the words "Account No.", signifies that such space is appropriated to account number one, which, in the example given, is the account of Mr. John P. Doe whose name, together with the other usual printed matter of a bill or statement, appears on the body of the blank, together with an unsigned and undated receipt. In addition to the designation of the marginal space 4' by the account number, said space is subdivided by a series of horizontal lines 16 into spaces appropriate to certain subdivisions of the account. The significance of these spaces is made apparent by suitable designations printed opposite thereto on the body of the blank. For instance, in the example given, the subdivisions of this marginal space or account column are appropriated to different periods of time, as for instance different days in the week, the total copies of the newspaper sold, the number of copies returned, the net number of copies sold, and the total amount charged. Therefore, the subdivisional designations in this instance are Mon., Tue., Wed., Thu., Fri., Sat., Total returns, Net and amount. On the stub 15 is printed any data appropriate to a return check, this stub being provided for use as a return check forwarded to the accounting department by the collector to indicate that the account has been paid and of course bearing on its face sufficient data to identify it with the statement from which it has been detached, as for instance, the name of the party, the total number of papers delivered, the number returned, the amount of the bill, and the date of payment.

Having placed the several statement sheets on the platen 1 and arranged them in the manner stated, securing them in place by pasting the strips 12 and 13 to the platen or by any other suitable means, a report sheet 17 is placed over the statement sheets, as shown in Fig. 1, and is secured to the platen by means of attaching strips 18 formed at the upper and lower edges of the report sheet by weakening lines 19'. These strips may be pasted to the margins of the subjacent statement sheets. The report sheet 17 is ruled to produce several series 19, 20 and 21, of subdivided account columns 22, the columns of each series being arranged in parallel relation and coinciding in dimensions with the marginal account spaces 4' of the subjacent statement blanks. In other words, the vertical lines 23, subdividing the columns, are in registering relation with the guide lines 2 on the platen, which lines, as we have already seen, constitute margin guides for the statement sheets 3. This correspondence of the account columns of the report sheet and the marginal spaces of the statement sheets presents them in complete registration, so that data printed in a subdivision of the report sheet may be simultaneously transferred to the corresponding subdivision of the statement blank through the medium of an interposed transfer element 24 slipped loosely between the report sheet and the subjacent statement sheets and preferably having one or more margins secured in place by pasting.

The several account columns 22 of the report sheet 17 are appropriately designated at the bottom as by a number, as shown in Fig. 1, and the subdivisions of the columns are also appropriately designated in correspondence with the subdivisional designations on the statement blanks. In other words, the report sheet 17 is provided with a compact arrangement of appropriately designated account columns which are in turn divided into appropriately designated subdivisions and each of said columns registers with the underlying marginal space of a statement blank having an appropriate designation corresponding to that of the account column and provided with similar subdivisions correspondingly designated. It follows therefore that when the appropriate data is entered in the account column of the report sheet, in making up the report of papers sold, such data will be simultaneously transferred to the proper statement blank with the result that the reporting and billing is accomplished by a single operation.

Having completed the reporting and billing, the report sheet 17 is detached from the strips 18 or such other securing device as may be substituted therefor and is bound with other similar report sheets for future reference. The statement sheets 3 are similarly removed from the strips 12 and 13 or other devices by which they are secured to the platen and are then separated along the lines 6 and 7 into individual statement blanks. These, as already stated, are properly receipted when the account is paid and the stub 15 is returned to the accounting department.

It is manifestly immaterial what designations are employed to express the special significance of the account columns or the subdivisions thereof. For example, in Figs. 5 to 8 inclusive, I have illustrated my reporting and billing system as used in connection with the advertising accounts of a newspaper, the names of the customers being exhibited in alphabetical order as appropriate designations for the account columns and numbers extending from 1 to 31 being exhibited opposite the subdivisions of the columns to indicate that these subdivisions are appropriated to the days of the month, since it is customary to submit advertising accounts monthly, instead of weekly. The numbers printed in the account column indicate the quantity of advertising, as for instance the number of inches or lines occupied by the advertiser's display. It will be noted, however, that the essential features of both of the illustrated forms of the invention are the same, that is to say, in both instances the several work sheets are supported by a suitable platen or backing, the report sheet is divided into a plurality of series of account columns, the columns of any given series being arranged in parallel relation and subdivided, both the columns and subdivisions thereof being appropriately designated and overlying the extended margins of statement sheets which overlap one another so that entries made in each column of the report sheet will be simultaneously transferred to the marginal column of a statement blank. In view of this similarity, I have indicated the various features of the arrangement shown in Figs. 5 to 8 inclusive by the same reference characters employed to indicate corresponding features in the first four figures, supplementing the reference character in each instance by the exponent $a$. For instance, the base is indicated as $1^a$, the guide lines thereon as $2^a$, the statement sheets as $3^a$, the extended margins thereof as $4^a$ and the marginal account columns as $4'^a$. Each sheet is traversed by weakening lines $5^a$, $6^a$, $7^a$, $8^a$ and $8^{aa}$ subdividing the statement sheet into two statement blanks $9^a$ and $10^a$, two name strips $a$ and $b$, and marginal securing strips $12^a$ and $13^a$, the name strips $a$ and $b$ having no counterpart in the first described form of the invention. In this form of the device the base $1^a$ is provided with transverse guide lines $2^{aa}$ in addition to the lines $2^a$. In the second form of the invention the report sheet is indicated as a whole by $17^a$, the marginal securing strips by $18^a$, the weakening lines defining such strips by $19'^a$, the two series of account columns by $19^a$ and $20^a$, the individual account columns by $22^a$, the vertical lines defining such columns by $23^a$ and the transfer sheet by $24^a$.

Before concluding, it may be stated that when the operation of combined reporting and billing as herein described is accomplished by means of a typewriter, the platen of the machine may be utilized as a backing for the work sheets in lieu of the flat platen or base 1 illustrated in the drawings, in which event any preferred form of work holder may be utilized to retain the several sheets in proper registering relation, as for instance, the usual platen clamps or work holders. If desired, however, even when the data is to be typewritten, the backing or base 1 may nevertheless be employed to facilitate the handling of the several sheets which may be secured in place upon the base and the device as a whole placed on the typewriter platen without requiring manipulation of the individual sheets by the typewriter operator. In fact, it is contemplated to have a number of these devices consisting of the base, report sheet and statement sheets, made up in quantity where the accounts cover stated periods, so that at the end of each period a reporting and billing device may be quickly and conveniently placed upon the platen of a typewriter and the reporting and billing operation promptly accomplished.

When the device is to be used in connection with a typewriter having a flat platen, the base 1 is preferably formed of some stiff material, as for instance metal, hard rubber or heavy paper board. If, on the contrary, a typewriter having a round platen is to be utilized the base or backing may be sufficiently flexible to conform to the curvature of the platen. It may also be remarked that while the guide lines on the base constitute a simple and convenient means for accurately positioning the sheets, any approved work guide or gage may be employed in lieu thereof.

It is thought that from the foregoing, the construction and mode of use of the described means for facilitating reporting and billing will be fully comprehended, but I wish to be distinctly understood as reserving the right to effect such modifications and variations of the illustrated forms of the invention as may come fairly within the scope of the protection prayed.

What I claim is:—

1. In combination, a sheet, a plurality of blanks underlying said sheet and overlapping one another and each having a marginal portion extended beyond the edge of an adjacent blank whereby said marginal portion of each blank will underlie a different portion of the sheet, and transfer means whereby data printed on the sheet will be transferred to the marginal portions of the several underlying blanks.

2. In combination, a report sheet having account columns, a plurality of underlying statement blanks overlapping one another and each having a marginal portion in underlying registration with a different account column of the report sheet, and transfer means intermediate of the report sheet and the statement blanks, whereby the entry of appropriate data on the report sheet and statement blanks may be accomplished simultaneously.

3. In combination a report sheet having designated account columns for the reception of data appropriate to individual accounts, said columns being subdivided into designated spaces for data appropriate to subdivisions of the account, a plurality of statement blanks having designations corresponding to those of the account columns, said statement blanks overlapping one another and each having a marginal portion in underlying registration with a different account column of the report, and transfer means between the report sheet and the statement blanks.

4. In combination, a report sheet having a plurality of series of account columns, said series being arranged one under another and the several columns of any given series being arranged in parallel relation and designated, and a plurality of statement sheets overlapping one another and each including a plurality of separably connected statement blanks, a marginal portion of each blank being in underlying registration with a different one of the account columns of the report sheet, and means for transferring to the statement blanks the data entered in the account columns of the report sheet.

5. In combination, a report sheet having a plurality of series of account columns, each column being designated, said series of columns being arranged one under another and the several columns of any given series being arranged in parallel relation and subdivided into spaces, each space being designated, a plurality of statement sheets overlapping one another and each comprising a plurality of separably connected statement blanks each having a subdivided marginal space in underlying registration with a different account column of the report sheet, each of said marginal spaces being designated in correspondence with the designation of the overlying account column, and means for transferring entries from the report sheet to the statement blanks.

6. In combination, a platen, a report sheet having account columns, said columns being designated, a plurality of statement blanks underlying the report sheet and overlapping one another to present marginal spaces of said blanks in underlying registration with the account columns of the report sheet, and means for detachably securing the several sheets to the platen in proper registration.

7. In combination, a report sheet having account columns and a weakening line extending parallel to one edge to produce a separable securing strip, a series of statement blanks underlying the report sheet and having marginal spaces in registration with the account columns of the report sheet, a weakening line defining a securing strip along an edge of each statement blank, and a support or platen to which the several securing strips of the report sheet and statement blanks are secured.

8. The combination with a support or platen having marginal guide lines, of a report sheet having columns in registration with said guide lines, and a plurality of statement blanks arranged in overlapping relation and each having an exposed edge in registration with one of the guide lines on the platen and transfer means whereby data printed in the columns of the report sheet will be transferred to the statement blanks.

9. The combination with a support or platen having marginal guides, of a sheet having columns in registration with said guides, a plurality of blanks underlying said sheet and registered with the guides, said blanks overlapping one another and each having a portion located beyond the edge of an adjacent blank and underlying a column of the sheet, and transfer means whereby data printed on the sheet will be transferred to the several underlying blanks.

In testimony whereof I affix my signature in presence of two witnesses.

HARVEY P. WELLMAN.

Witnesses:
A. M. EAMES,
K. M. SMITH.